(12) United States Patent
Schmidt

(10) Patent No.: US 9,764,700 B2
(45) Date of Patent: Sep. 19, 2017

(54) METHOD AND DEVICE FOR ADAPTING A VOLTAGE LIMIT IN AN ONBOARD ELECTRICAL SYSTEM

(71) Applicant: Robert Bosch GmbH, Stuttgart (DE)

(72) Inventor: Matthias Schmidt, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 402 days.

(21) Appl. No.: 14/367,049

(22) PCT Filed: Dec. 19, 2012

(86) PCT No.: PCT/EP2012/076237
§ 371 (c)(1),
(2) Date: Jun. 19, 2014

(87) PCT Pub. No.: WO2013/092765
PCT Pub. Date: Jun. 27, 2013

(65) Prior Publication Data
US 2014/0368031 A1 Dec. 18, 2014

(30) Foreign Application Priority Data

Dec. 19, 2011 (DE) .................. 10 2011 088 973
Dec. 3, 2012 (EP) .................. PCT/EP2012/074262

(51) Int. Cl.
*H02H 7/18* (2006.01)
*B60R 16/03* (2006.01)
(Continued)

(52) U.S. Cl.
CPC .............. *B60R 16/03* (2013.01); *B60L 11/18* (2013.01); *B60L 15/2045* (2013.01);
(Continued)

(58) Field of Classification Search
CPC ....... B60R 16/03; B60R 16/033; B60R 16/02; B60R 16/0238; B60R 13/06;
(Continued)

(56) References Cited

U.S. PATENT DOCUMENTS 5,847,520 A 12/1998 Theurillat et al.
6,454,033 B1 * 9/2002 Nathan .................. B60K 17/02
180/307

(Continued)

FOREIGN PATENT DOCUMENTS

DE 4307907 5/1994
DE 10046631 3/2002
(Continued)

OTHER PUBLICATIONS

International Search Report for PCT/EP2012/076237, issued on Jun. 21, 2013.

*Primary Examiner* — Jared Fureman
*Assistant Examiner* — Esayas Yeshaw
(74) *Attorney, Agent, or Firm* — Norton Rose Fulbright US LLP; Gerard Messina

(57) ABSTRACT

A method is described for controlling a voltage limit for a maximally permissible operating voltage in an on-board electrical system of a vehicle, including the step of adapting the voltage limit in dependence on vehicle data, wherein an actual voltage is ascertained and the actual voltage is short-circuited or limited if the actual voltage exceeds the voltage limit. Also described is a device for controlling a voltage limit for a maximally permissible operating voltage in an on-board electrical system of a vehicle, having an adaptation device for adapting the voltage limit in dependence on vehicle data.

13 Claims, 4 Drawing Sheets

(51) Int. Cl.
  B60L 11/18 (2006.01)
  B60L 15/20 (2006.01)
  H02J 7/14 (2006.01)
  B60L 3/00 (2006.01)
  B60L 3/04 (2006.01)
  B60L 7/10 (2006.01)

(52) U.S. Cl.
  CPC ............ *H02J 7/1446* (2013.01); *B60L 3/0046* (2013.01); *B60L 3/04* (2013.01); *B60L 7/10* (2013.01); *Y02T 10/645* (2013.01); *Y02T 10/7005* (2013.01); *Y02T 10/72* (2013.01); *Y02T 10/7283* (2013.01); *Y02T 10/92* (2013.01)

(58) Field of Classification Search
  CPC .............. B60R 16/005; B60R 16/0207; B60R 16/0215; B60R 16/023; B60R 16/0231; B60R 16/0236
  USPC ........................................................ 307/10.1
  See application file for complete search history.

(56) References Cited

U.S. PATENT DOCUMENTS

| | | | | |
|---|---|---|---|---|
| 2003/0127912 | A1* | 7/2003 | Mackel | H02J 1/08 307/10.1 |
| 2004/0021448 | A1 | 2/2004 | Bluemel et al. | |
| 2004/0065489 | A1* | 4/2004 | Aberle | B60L 11/1887 180/65.1 |
| 2006/0108987 | A1* | 5/2006 | Aoyama | H02J 7/0047 322/28 |
| 2008/0156551 | A1* | 7/2008 | Kawahara | B60L 11/1803 701/22 |
| 2009/0212725 | A1 | 8/2009 | Wallner | |
| 2009/0229898 | A1* | 9/2009 | Fujino | B60L 7/24 180/65.29 |
| 2011/0114401 | A1* | 5/2011 | Kanno | B60L 5/005 180/65.21 |
| 2014/0309827 | A1* | 10/2014 | Kanzaki | B60L 3/04 701/22 |
| 2015/0120084 | A1* | 4/2015 | List | B60R 21/017 701/1 |
| 2015/0258897 | A1* | 9/2015 | Okada | B60L 7/14 318/376 |

FOREIGN PATENT DOCUMENTS

| | | |
|---|---|---|
| DE | 10105903 | 8/2002 |
| DE | 10213105 | 11/2002 |
| DE | 102004041511 | 3/2006 |
| DE | 102005016300 | 10/2006 |
| DE | 102005051433 | 5/2007 |
| DE | 102006002985 | 8/2007 |
| DE | 102009000222 | 7/2010 |
| DE | 102011000665 | 8/2011 |
| GB | 2201848 | 9/1988 |

\* cited by examiner

METHOD AND DEVICE FOR ADAPTING A VOLTAGE LIMIT IN AN ONBOARD ELECTRICAL SYSTEM

FIELD OF THE INVENTION

The present invention relates to a method for controlling a voltage limit for a maximally permissible operating voltage in an on-board electrical system of a hybrid vehicle and to a corresponding device.

BACKGROUND INFORMATION

In on-board electrical systems of vehicles, the problem arises that they have a fixed voltage limit. The voltage limit represents a maximally permissible voltage value for the voltage in the on-board electrical system. If the actual voltage in the on-board electrical system exceeds the predefined voltage limit, the actual voltage may be short-circuited or otherwise limited so as to keep to the voltage limit in the on-board electrical system.

If, however, during braking of the vehicle, voltages above the voltage upper limit are produced by way of operation in generator mode, for safety reasons those voltages are often short-circuited or otherwise limited, with the result that they cannot be used for recharging of an accumulator or a battery. Vehicles that use those on-board electrical systems therefore have a high fuel consumption.

SUMMARY

An object underlying the present invention is to provide an on-board electrical system that renders possible a more efficient use of braking energy and that at the same time has a high level of safety.

In accordance with one aspect of the present invention, that object is attained through a method for controlling a voltage limit for a maximally permissible operating voltage in an on-board electrical system of a vehicle, which method includes the step of adapting the voltage limit in dependence on vehicle data. That provides the advantage that different voltage upper limits may be set for the voltage in an on-board electrical system, according to the vehicle situation and condition, and so the voltage available in the on-board electrical system is efficiently stored and used at any time.

That means that, according to the invention, a method for controlling the voltage limit for the maximally permissible operating voltage in the on-board electrical system of the vehicle is provided which includes the step of adapting the voltage limit in dependence on vehicle data, wherein an actual voltage is ascertained and the actual voltage is short-circuited or limited if the actual voltage exceeds the voltage limit.

In one advantageous embodiment, the vehicle data indicate the speed of the vehicle and the voltage limit is adapted in dependence on the speed. The use of speed data provides the advantage that the voltage limit may be altered flexibly according to the speed of the vehicle.

The vehicle data may be data on a current speed, for example a measured speed value, an acceleration, for example a measured acceleration value, or some other movement of the vehicle. The vehicle data may also be data on the activation or a deactivation of a braking system, for example when a brake pedal is actuated. In addition, the vehicle data may be data on the locked or closed state of certain parts of the vehicle, such as, for example, an engine hood or a battery cover. Besides that, the vehicle data may, however, include all other data whose use enables the maximally permissible voltage, that is, the voltage limit, in the on-board electrical system to be suitably controlled.

In a further advantageous embodiment, the voltage limit is raised if a predefined speed of the vehicle is exceeded, for example at a predefined speed of 10 km/h. Raising the voltage limit provides the advantage that, at higher speeds of the vehicle, at which at the same time higher voltages occur during braking, a voltage generated by a braking generator may be efficiently used.

In a further advantageous embodiment, the voltage limit below the predefined speed is set to a predefined value, especially a value of 60 V or below. That provides the advantage, for example, that it is possible to dispense with elaborate measures for protection against contact with the electronics.

In a further advantageous embodiment, a voltage value that indicates a load dump in the on-board electrical system is set in dependence on the adapted voltage limit. That provides the advantage that a load dump is reliably detected and suitable measures may be taken even in the case of a variable voltage upper limit in the on-board electrical system.

In a further advantageous embodiment, the voltage value that indicates a load dump in the on-board electrical system is in each case above the adapted voltage limit by a predefined amount, for example by a predefined amount of 5 V. That provides the advantage of being able to detect a load dump with a particular degree of certainty.

In a further advantageous embodiment, the vehicle data are data that indicate an actuation of a brake pedal and the voltage limit is adapted in dependence on an actuation of the brake pedal. That provides the advantage that a situation in which a higher voltage may occur in the on-board electrical system may be recognized using particularly simple means.

In a further advantageous embodiment, the voltage limit is raised upon actuation of a brake pedal and the raised voltage limit is lowered after a predefined period of time after a release of the brake pedal. That provides the advantage that a particularly safe method is implemented, in which the voltage limit is raised essentially only during the actuation of a brake pedal.

In a further advantageous embodiment, the vehicle data indicate an acceleration of the vehicle and the voltage limit is adapted in dependence on an acceleration. That provides the advantage that the safety of the on-board electrical system is further improved, since an increased, maximally permissible voltage value for the on-board voltage is used only during the period in which an increased voltage is able to occur in the on-board electrical system, for example on account of a braking operation.

In accordance with a further aspect of the present invention, the object according to the invention is attained through a device for controlling a voltage limit for a maximally permissible operating voltage in an on-board electrical system of a vehicle, which device includes an adaptation device for adapting the voltage limit in dependence on vehicle data. In that manner, the same advantages are obtained as are obtained by the corresponding method.

DETAILED DESCRIPTION

As part of the public debate on CO2 and in view of constantly rising fuel prices, systems for reducing fuel consumption and CO2 emissions are becoming increasingly important.

Once possibility of achieving the goal of lower fuel consumption consists in hybridizing the drive train, in which case the drive train has both an electric drive and a combustion drive/combustion engine. The saving in fuel is achieved by recovery (recuperation) of the kinetic energy released during braking or of the potential energy released in driving downhill. For example, the recovered energy may be used to supply the vehicle's own on-board electrical system. That has a markedly positive effect on fuel consumption. Key components for the hybridization of the drive train are an electric drive and a high-performance battery.

In particular, the torque of the combustion engine may be increased by a torque of the electric drive (boost) in order, for example, to improve the dynamics of vehicle movement, such as, for example, in what is referred to as boost recuperation systems. If more energy is recovered by recuperation than is required for supplying the on-board electrical system and the boost function, then there is also the possibility of reducing the torque of the combustion engine in a specific manner and compensating for it or supplementing it by a torque of the electric drive. That shifting of the load point enables a reduction in fuel consumption to be achieved.

Alongside that, however, further functions must also be safeguarded. For example, it is necessary to ensure that the on-board electrical system is reliably supplied with energy also during relatively long stationary phases while idling, for example in traffic jams. That requires the on-board electrical system to be supplied by the generator even when the vehicle is stationary.

Hereinafter the term "electric drive" is to be understood as meaning a unit composed of an electric motor/electric machine and an inverter, which is capable of being operated both as a motor, that is, to drive the vehicle, and as a generator, that is, to recover electrical energy.

Figure 1:
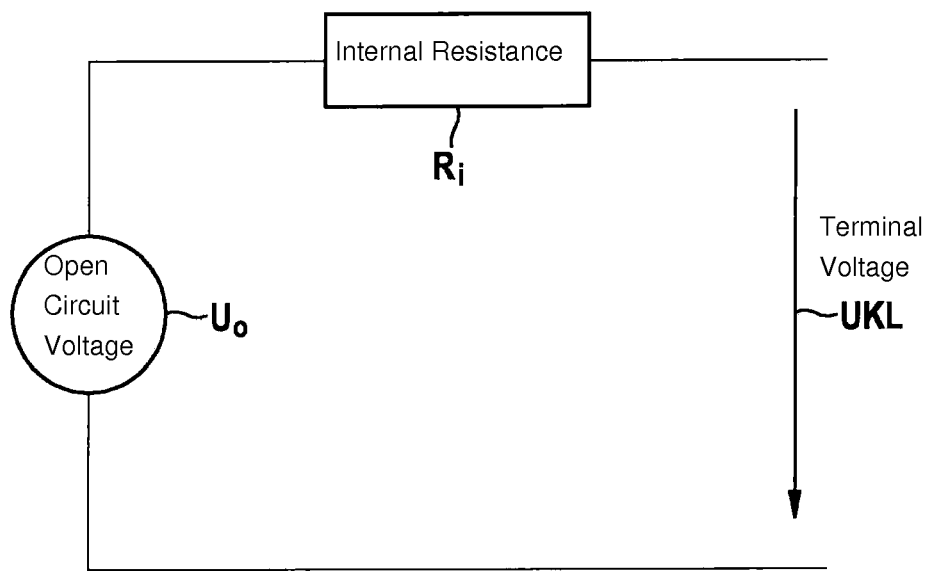
FIG. 1 shows an equivalent circuit diagram for a battery.

FIG. 1 shows a simple equivalent circuit diagram of a battery forming part of an on-board electrical system in a hybrid vehicle.

To charge the battery, the terminal voltage UKL must be raised above the open-circuit voltage U0 of the battery since a charging current of the battery is limited to a first approximation by the internal resistance in accordance with the formula $I=(UKL-U0)/Ri$.

If the battery is to be charged with as high a current as possible during a period in which energy is being recovered during braking, that is, in a recuperation phase, the internal resistances of battery and supply line lead to its being necessary to apply to the battery terminals a voltage that is distinctly above the open-circuit voltage U0 in order to generate a current for charging the battery. For example, in the case of Li ion batteries of nickel-cobalt-manganese (NCM) cell chemistry with 14 cells in series, voltages of around and above 60 V occur.

When choosing the battery it is advantageous to select as high as possible an output voltage in order to produce as high as possible a boost or recuperation performance with a given current. Especially in motor mode (boost), a high output voltage is a prerequisite for being able to perform the boost function even at higher engine speeds.

In order to ensure, however, that people are not put at risk at high voltages, it should be ensured that the voltage in the on-board electrical system is always less than 60 V, especially if parts of the on-board electrical system may be touched by people, for example maintenance or service personnel. Using known means, however, that may be achieved only if the battery voltage is selected to be sufficiently low and if, during recuperation, a voltage rise above 60 V at maximum current is avoided.

In the related art, the maximally permissible generator voltage or the voltage of the on-board electrical system is therefore limited as a rule to a specific value to save on elaborate measures for electrical isolation of power lines or for protection against contact. However, those measures inevitably lead to a limitation of the battery current and storage capacity. It is not possible, therefore, for the generative braking power, that is, the recuperation power, to be efficiently recovered, which automatically leads to an increase in fuel consumption. Alongside that, in such on-board electrical systems involving recuperation, what is referred to as a load dump may occur, especially when an electric drive is being operated as a generator during braking and the battery is unexpectedly switched off or disconnected. Since, however, it takes a certain length of time before the magnetic field decays, the generator induces an amount of current that is too great for that moment and what is referred to as a voltage spike occurs in the on-board electrical system, which may, for example, markedly exceed a predefined voltage value of 60 V. That process is also referred to as a load dump.

If suitable countermeasures are not initiated when a load dump occurs, the voltage spike produced may lead to electrical components of the on-board electrical system being destroyed.

To limit the voltage in the case of a load dump, various measures are possible. One of those countermeasures is to short-circuit the electric drive via an inverter. However, the active short-circuit must be actively actuated or effectuated. A load dump is therefore first detected by ascertaining whether the voltage in the on-board electrical system or at the electric drive exceeds a predefined voltage value or whether there is a corresponding rise in voltage. In doing so, a sufficiently large detection threshold should be selected between the maximally permissible generator voltage or on-board system voltage and the threshold value for detecting a load dump. Suitable countermeasures are then initiated in response to the detection of such a load dump.

Present-day hybrid vehicles typically have, in addition to the combustion engine, an electric drive with a voltage above 100 V. For entry-level hybridizations, however, voltages below 100 V, especially below 60 V, are also conceivable since in that case considerably less expenditure is required for protection against contact.

Figure 2:
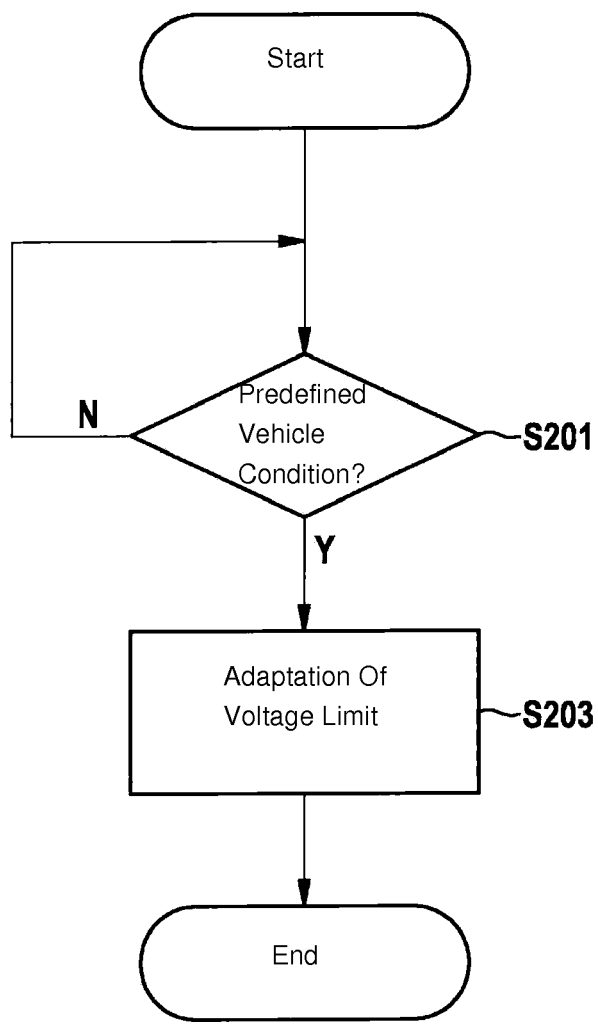
FIG. 2 shows a first embodiment of the method according to the invention.

FIG. 2 shows a first embodiment of the method according to the present invention. First, in step S201, it is determined by reference to vehicle data whether a predefined vehicle condition exists.

The vehicle data may indicate data on a current speed, for example a measured speed value, an acceleration, for example a measured acceleration value, or some other movement of the vehicle. The vehicle data may also be data on the activation or a deactivation of a braking system, for example an actuation of a brake pedal. In addition, the vehicle data may be data on the locked or closed state of certain parts of the vehicle, such as, for example, a locked or closed state of an engine hood or of a battery cover. Alongside that, the vehicle data may, however, include all other data whose use enables the maximally permissible voltage, that is, the voltage limit, in the on-board electrical system to be suitably controlled. The data serving as vehicle data may be detected by different sensors and communicated to a control device for the voltage limit. Such sensors may be formed by a speed sensor, an acceleration sensor, a locking sensor or by other sensors for detecting a specific actual value.

If, after the determination by reference to the vehicle data, a given vehicle condition exists, the method continues with step S203 in which an adaptation of the voltage limit for a voltage that is maximally permissible in the on-board electrical system is carried out.

The adaptation according to the invention of the voltage that is maximally permissible in the on-board electrical system is also to be understood as being adaptation in a portion of the on-board electrical system, for example in that portion of the on-board electrical system which includes the recuperation generator or electric drive.

Various conditions which, when they occur, each involve different adaptation steps S203 of the voltage limit in the on-board electrical system being carried out are conceivable as possible vehicle conditions S201.

For example, exceeding a predefined vehicle speed, for example 10 km/h, may be used as a condition S201. If that condition occurs, adaptation of voltage limit S203 in the on-board electrical system takes place by the voltage limit being raised, for example from 60 V to 64 V. That provides the advantage that a person, such as, for example, a service technician, is not put at risk by a high voltage when the vehicle is stationary, and the safety of the on-board electrical system is improved. If the vehicle speed falls below the predefined speed value again, the voltage limit may be lowered again, for example from 64 V to 60 V.

The speed may be ascertained, for example, by way of the rotational speed of the wheels of the vehicle or via a GPS signal. Detection via a GPS signal offers the advantage that the voltage limit is raised only in the case of a vehicle that is actually moving. If, however, the vehicle is on an engine test bed, then by using the GPS signal for detecting the speed it is possible to reliably prevent the voltage limit from being raised even though rotational movement of the vehicle wheels is taking place. It is also conceivable, however, for a rotational speed of the wheels and a GPS signal to be used in combination in order to verify the speed of the vehicle. Temporarily raising the voltage of the on-board electrical system in dependence on the speed provides the advantage that the limitation of the on-board voltage does not lead to increased consumption by the vehicle.

As an alternative condition S201, detection of a stationary state of the vehicle may be used. If that condition occurs, adaptation of voltage limit S203 in the on-board electrical system takes place by the voltage limit being set in the stationary state to a given value that is to be regarded as not being hazardous. That also provides the advantage that the safety of the on-board electrical system is improved. In that case also, the stationary state of the vehicle may be detected by way of a stationary state of the wheels of the vehicle or via a GPS signal.

As a further alternative condition S201, detection of a negative acceleration, that is, a braking, of the vehicle may be used. If that condition occurs, an adaptation of voltage limit S203 in the on-board electrical system takes place by the voltage limit being increased to a given value, for example from 60 V to 64 V. That provides the advantage that the safety of the on-board electrical system is further improved since an increased maximally permissible voltage value for the on-board voltage is used only when an increased voltage is able to occur in the on-board electrical system. An acceleration value may, for example, be determined by an acceleration sensor or by the derivative of the detected speed with respect to time. In this case too, exceeding of a predefined acceleration value may be used as a threshold value for performing adaptation step S203.

As a further alternative condition S201, detection of an activation of a brake system, for example stepping on or actuating the brake pedal, of the vehicle may be used. If that condition occurs, adaptation of voltage limit S203 in the on-board electrical system takes place by a voltage limit being increased to a given value, for example from 60 V to 64 V, provided the speed is above a given threshold. That provides the advantage that further sensors for detecting an acceleration may be dispensed with and the layout becomes simpler.

Thereafter, deactivation of the brake system again may be detected. After a given period of time after deactivation of the brake system, the maximally permissible voltage limit in the on-board electrical system may be lowered again, for example to 60V. Lowering of the voltage limit again re-establishes the safety of the on-board electrical system.

As a further alternative condition S201, the detection of an opening or an unlocking of an engine hood or a battery cover of the vehicle may be used. If that condition occurs, an adaptation S203 of the voltage limit in the on-board electrical system takes place by the voltage limit being set to a predefined non-hazardous value, for example to a value below 60 V. That provides the advantage that a high level of safety of the on-board electrical system is ensured on opening of the engine hood and that high operating voltages may otherwise be used even when the vehicle is stationary.

Instead of the conditions described above, however, other conditions for adapting the maximally permissible voltage limit in the on-board electrical system are also conceivable in general, which on the one hand improve the safety of the on-board electrical system and on the other hand have a positive effect on the fuel consumption of the vehicle as a result of the voltage limit for a maximally permissible operating voltage being temporarily raised or changed during recuperation phases.

Such conditions may, for example, be driving conditions or movement conditions of the vehicle or locked or unlocked conditions of certain parts of the vehicle.

The dynamic adaptation of the voltage limit provides the advantage that it is also possible to use batteries of a higher output voltage or open-circuit voltage, such as, for example, NCM-Li ion cells with 14 cells having an output voltage close to 60 V, and the efficiency of the drive train is improved. Although voltages above 60 V may temporarily occur in the on-board electrical system during operation of the vehicle, it is nevertheless possible for protection measures against contact to be largely dispensed with. Altogether, by situation-dependent adaptation of the on-board system voltage, it is possible to provide in that manner a highly efficient yet extremely safe on-board electrical system.

Figure 3:
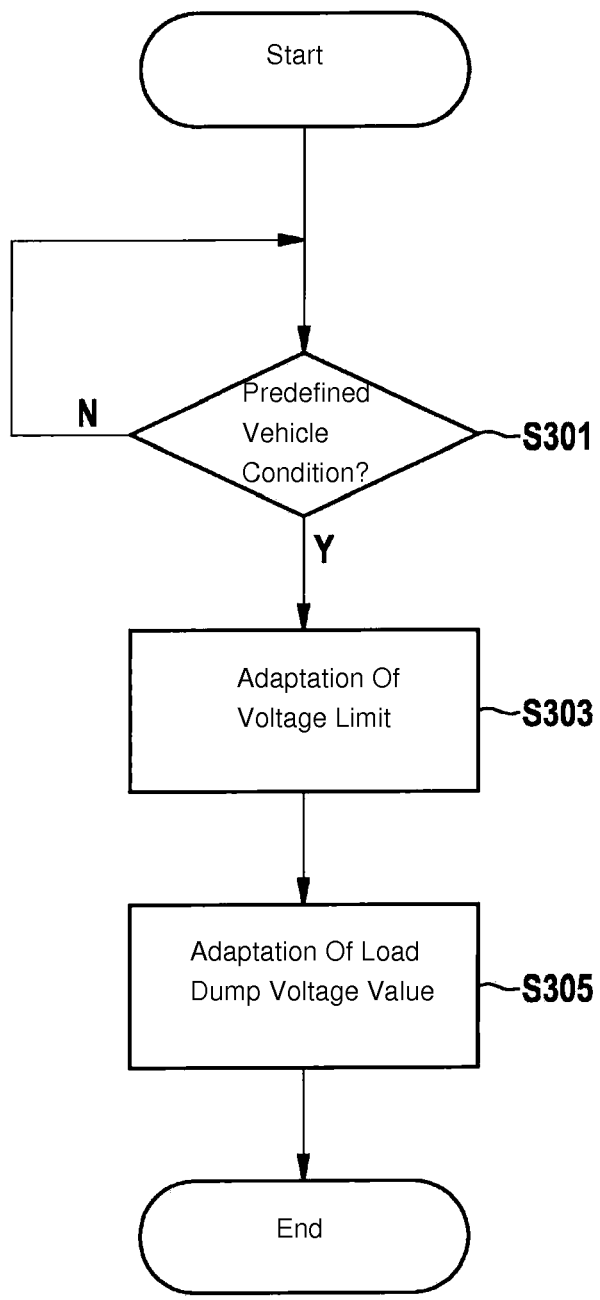
FIG. 3 shows a second embodiment of the method according to the invention.

FIG. 3 shows a further embodiment of the method according to the present invention. In this embodiment, method steps S301 and S303 correspond to method steps S201 and S203 respectively. In addition, the method shown in FIG. 3 includes a further step S305, in which a voltage value that indicates a load dump in the on-board electrical system is adapted. That is done directly after the voltage limit for a voltage that is maximally permissible in the on-board electrical system is adapted. The voltage value that indicates a load dump in the on-board electrical system therefore represents a threshold value that, when exceeded, causes further protection measures against a load dump to be initiated.

An adaptation performed in step S305 may, for example, include increasing, setting or lowering the voltage value for detecting a load dump. It is especially advantageous if the voltage value for detecting a load dump is above the maximally permissible voltage limit in the on-board electrical system by a fixed volt quantity, for example by 5V. In that case, the voltage value for detecting a load dump tracks the voltage limit for the maximally permissible operating voltage. If the maximally permissible voltage limit in the on-board electrical system changes, the threshold value for the detection of the load dump is therefore also changed automatically in such a way that reliable detection of any load dump taking place is made possible.

That provides the advantage that a load dump is sure to be detected even if the voltage limit in the on-board electrical system has been changed or adapted, and false activation of a load dump protection measure, for example short-circuiting of an inverter, is avoided.

Instead of the maximally permissible voltage being used, the instantaneous desired voltage may also be used as a reference point for load dump recognition, since the desired voltage is less than the maximally permissible voltage. If, for example, a vehicle is traveling at 50 km/h, the maximally permissible voltage could be 62 V. The desired voltage, which differs from the maximally permissible voltage, could, however, without recuperation taking place, lie at a voltage value of 57 V. In that case, the threshold value for detecting a load dump could be set to 62 V starting from the desired voltage by adding a voltage interval of 5 V to the desired voltage.

The dynamic tracking of the load dump recognition threshold is therefore a prerequisite for safely keeping to the contact protection voltage limits even in the event of a load dump and for nevertheless being able to utilize the full recuperation potential at higher speed.

In vehicles in which a combustion engine is automatically restarted when, for example, the battery reaches a critical state of charge owing to discharging by the on-board electrical system while the vehicle is stationary, an engine hood switch for detecting an open state of the engine hood may be used to prohibit operation in generator mode when the engine hood is open, either always or at least when the vehicle is stationary.

If operation in generator mode is not permitted, it is not possible for a load dump to occur and the on-board electrical system is limited to the maximum battery voltage. When a Li ion battery having 14 cells is used, the on-board system voltage is therefore below a value of 60 V.

The measures described above therefore serve the purpose in hybrid vehicles of keeping to a contact protection voltage limit of, for example, 60 V in certain situations. Those measures ensure that people cannot come in contact with voltages that are above a predefined value of, for example, 60 V and that nevertheless the recuperation and fuel saving potential is not limited on account of that voltage limit.

Figure 4:
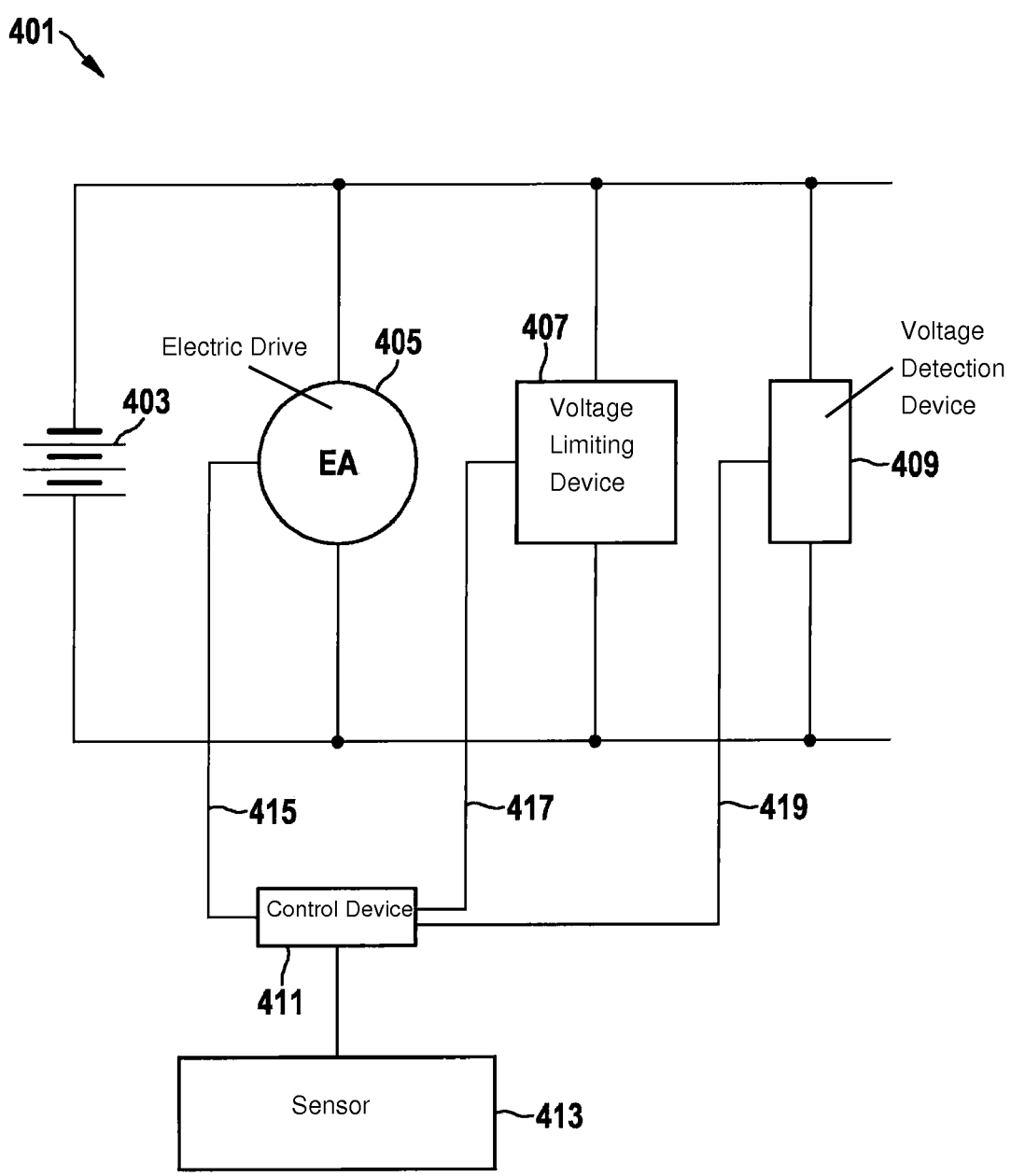
FIG. 4 shows an on-board electrical system having a device for controlling a voltage limit for a maximally permissible operating voltage.

FIG. 4 shows an on-board electrical system 401 according to the invention, which is suitable for adapting a voltage limit for a maximally permissible voltage in on-board electrical system 401. On-board electrical system 401 includes an energy storage device 403 for electrical energy, for example a battery or an accumulator, an electric drive 405 for electrically driving the hybrid vehicle, an optional controllable voltage limiting device 407, a voltage detection device 409 and a control device 411.

Battery 403 is adapted in such a way that quantities of current obtained in a recuperation operation may be reliably stored. For example, such a battery may be a Li ion battery or another battery suitable for that purpose.

Electric drive 405 serves not only to drive the vehicle but also to recover electrical energy in recuperation operation. In particular, depending on the type and intensity of the energy recovery, voltages of differing magnitudes may be fed into the on-board electrical system. In addition, the electric drive includes an inverter, not shown, which in the event of a load dump is short-circuited by a control device 411 via a control line 415. Short-circuiting of the phases of the electric machine by the inverter forms an effective measure against the voltage increase due to the load dump and prevents damage to electrical components of the on-board electrical system.

The optional, controllable voltage limiter 407 is also connected to control device 411 via a control line 417 and limits a voltage that occurs in the on-board electrical system to a set limit value representing the maximally permissible voltage limit. Such a voltage limiter may, for example, be formed by a voltage limiter circuit.

Voltage detection device 409 serves to detect the voltage in on-board electrical system 401, such as, for example, a voltage measuring device. The detected voltage value is communicated to control device 411 via a signal line 419. When the limit value for recognition of a load dump is exceeded, a measure for limiting the voltage in the on-board electrical system, for example short-circuiting of the phases by the inverter, is triggered by control device 411.

Control device 411 processes the incoming signals in order to carry out control on the basis of those signals. On the one hand, control device 411 controls the inverter of electric drive 405 in such a way that, when a voltage value indicating a load dump in the on-board electrical system is exceeded, the electric drive is short-circuited. The voltage value for detecting a load dump is set by control device 411 in that case in dependence on the selected, maximally permissible voltage limit.

In addition, control device 411 is connected to a sensor 413. Sensor 413 communicates to control device 411 measured vehicle data that form the basis for determining the maximally permissible voltage limit in on-board electrical system 401. If the vehicle data meet a predefined condition, the maximally permissible voltage limit is adapted.

The voltage limit represents a maximally permissible voltage value for the voltage in the on-board electrical system. If the actual voltage in the on-board electrical system exceeds the predefined voltage limit, the actual voltage may be short-circuited or otherwise limited or alternatively the voltage limit may be temporarily raised or changed.

Sensor 413 may, for example, be a speed sensor, an acceleration sensor, a movement sensor, a locking sensor, such as, for example, an engine hood sensor, or a brake system activation sensor. In general, all sensors that provide suitable data in order to be able to carry out the above-described control of a maximally permissible voltage upper limit in the on-board electrical system come into consideration.

Control device 411 may be formed by a suitable electrical circuit, a programmable logic or a processor and may include a volatile or non-volatile memory in which control parameters and control programs are stored.

The device according to the invention for controlling a voltage limit for a maximally permissible operating voltage in an on-board electrical system of a vehicle is not, however, limited to the on-board electrical system shown, but may also be employed in suitable other on-board electrical systems or on-board electrical sub-systems.

The present invention is suitable in principle for all vehicles having a hybrid drive or purely a recuperation function. Individual features of the invention described in connection with the various embodiments may be combined with one another in any desired manner in order to obtain their advantageous effects.

LIST OF REFERENCE SYMBOLS

Ukl terminal voltage
U0 open-circuit voltage
Ri internal resistance
S201-S203 method steps
S301-S303 method steps
403 battery
405 electric drive
407 voltage limiting device
409 voltage detection device
411 control device
413 sensor
415 control line
417 control line
419 signal line

What is claimed is:

1. A method for controlling a voltage limit for a maximally permissible operating voltage in an on-board electrical system of a vehicle, comprising:
regulating an actual voltage of the on-board electrical system to a desired voltage, wherein the desired voltage is less than the maximally permissible operating voltage;
one of limiting and short-circuiting the actual voltage if the actual voltage exceeds the maximally permissible operating voltage in the on-board electrical system; and
adapting the voltage limit in dependence on vehicle data by one of raising and lowering the voltage limit, wherein the voltage limit is adapted temporarily from a first value that is above a voltage of a battery of the on-board electrical system to a second value that is above the first value.

2. The method as recited in claim 1, wherein the vehicle data indicate a speed of the vehicle and the voltage limit is adapted in dependence on the speed.

3. The method as recited in claim 2, wherein the voltage limit is raised if a predefined speed of the vehicle is exceeded.

4. The method as recited in claim 3, wherein the voltage limit below the predefined speed is set to a predefined value.

5. The method as recited in claim 4, wherein the predefined value is below 60 V.

6. The method as recited in claim 1, wherein a voltage value that indicates a load dump in the on-board electrical system is set in dependence on the voltage limit produced by the adapting.

7. The method as recited in claim 6, wherein the voltage value that indicates the load dump in the on-board electrical system is in each case above the voltage limit produced by the adapting by a predefined amount.

8. The method as recited in claim 1, wherein the vehicle data are data that indicate an actuation of a brake pedal, and the voltage limit is adapted in dependence on the actuation of the brake pedal.

9. The method as recited in claim 8, wherein the voltage limit is raised upon actuation of the brake pedal, and the raised voltage limit is lowered after a predefined period of time after a release of the brake pedal.

10. The method as recited in claim 1, wherein the vehicle data indicate an acceleration of the vehicle, and the voltage limit is adapted in dependence on the acceleration.

11. The method as recited in claim 1, wherein:
when the vehicle data indicates an unlocking of an engine hood, the voltage limit is lowered, and
when the vehicle data indicates a locking of the engine hood, the voltage limit is raised.

12. A device for controlling a voltage limit for a maximally permissible operating voltage in an on-board electrical system of a vehicle, comprising:
an arrangement for regulating an actual voltage of the on-board electrical system to a desired voltage, wherein the desired voltage is less than the maximally permissible operating voltage;
an arrangement for one of limiting and short-circuiting the actual voltage if the actual voltage exceeds the maximally permissible operating voltage in the on-board electrical system; and
an arrangement for adapting the voltage limit in dependence on vehicle data by one of raising and lowering the voltage limit, wherein the voltage limit is adapted temporarily from a first value that is above a voltage of a battery of the on-board electrical system to a second value that is above the first value.

13. The device as recited in claim 12, wherein:
when the vehicle data indicates an unlocking of an engine hood, the voltage limit is lowered, and
when the vehicle data indicates a locking of the engine hood, the voltage limit is raised.

* * * * *